Aug. 28, 1934.    L. F. KREGER    1,971,752
MOTOR SUPPORT
Filed Nov. 20, 1933
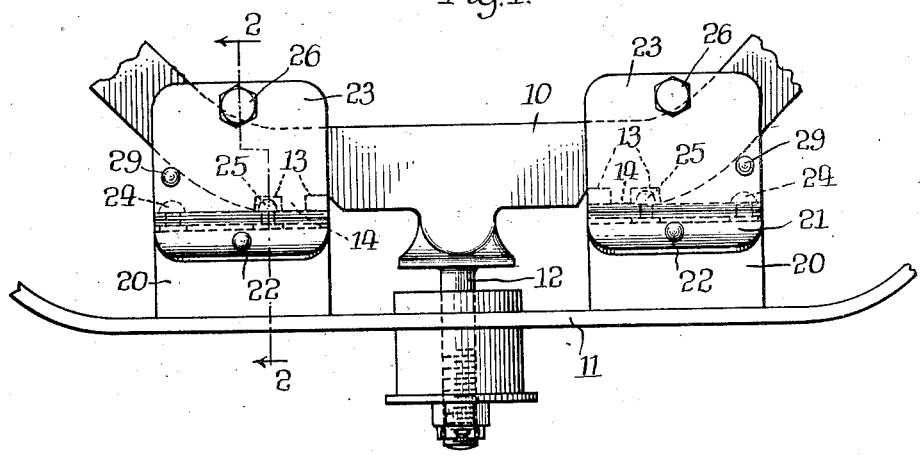
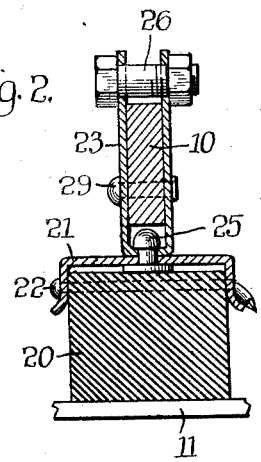
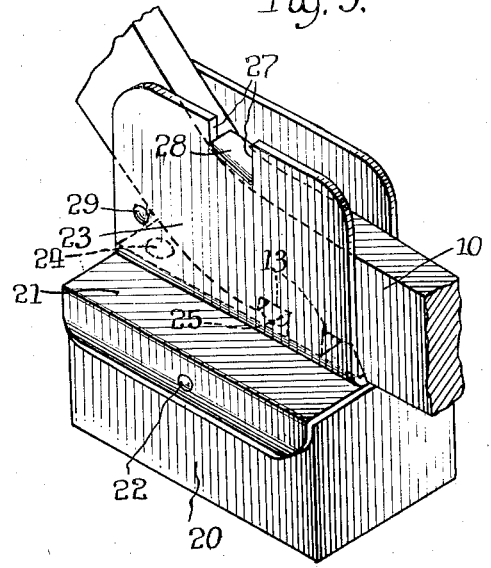
Inventor
Lawrence F. Kreger,
by Chindahl, Parker & Carlson
Attys.

Patented Aug. 28, 1934

1,971,752

UNITED STATES PATENT OFFICE 1,971,752

MOTOR SUPPORT

Lawrence F. Kreger, Chicago, Ill.

Application November 20, 1933, Serial No. 698,844

10 Claims. (Cl. 248—14.2)

The invention relates generally to motor supports and more particularly to a resilient support for the front end of an automobile motor.

In a certain model of a well-known make of automobile, the front end of the motor rests on a motor support arm which extends transversely of the automobile with its ends curved upwardly and attached to the motor. The arm is usually made of a heavy steel strip and is supported by a pair of coiled springs resting on an auxiliary spring on a cross member of the chassis. The upper end of each spring fits around a lug formed on the lower edge of the arm by punching a pair of notches in said lower edge. These springs are subjected to frequent flexing and to jarring, and tend to crystallize and break. They also tend to produce rattles and other undesirable noises when the automobile is operating, and are apt to slip out of place.

As a substitute for these springs, rubber blocks, usually cylindrical in form, have been provided. With such a block, a metallic cap is fitted over the upper end of the block. An annular flange is formed on the upper face of the cap and fits around the lug on the lower edge of the arm to position the block.

It sometimes occurs that, on a rebound, the motor support arm and the cross member of the chassis separate to such an extent that the cap may slip off the lug on the motor support arm. This permits the rubber block to fall out of place between the arm and the cross member.

The general object of the present invention is to provide a motor support adapted to be interposed between the arm and cross member, which cannot be easily broken, which prevents noise, and which cannot become dislodged from its proper position.

Another object is to provide a support of this character which provides ample support for the motor and which may be readily substituted for the spring or the above-described rubber-block type.

Other objects and advantages will become apparent from the following description taken in connection with the accompanying drawing, in which:

Figure 1 is a front elevation of a motor support embodying the features of the invention and shown in with the motor support arm and chassis cross member.

Fig. 2 is a vertical section taken on the line 2—2 of Fig. 1.

Fig. 3 is a perspective view showing a modified form of the device.

In the drawing, the motor support arm is indicated at 10 and comprises a heavy strip of metal positioned edgewise and extending transversely of the motor. The ends of the arm are curved upwardly and are attached to the motor. The arm 10 is positioned over a cross member 11 of the chassis and has a center stud 12 extending downwardly through the cross member 11. Normally a pair of coiled springs are placed between the arm 10 and the cross member 11 at the respective side of the center, each spring resting on the cross member 11. To seat the arm 10 on the upper end of the spring, a pair of notches 13 are cut in the lower edge of the arm to provide a lug 14 extending into the upper end of the spring. As mentioned above, these springs tend to crystallize and break due to the large amount of vibration and jarring to which they are subjected, and to jump out of place.

The present invention provides a pair of devices adapted to be substituted for the springs, which are not subject to such breakage and are retained in proper position, thus avoiding the difficulty incurred with the usual type of substitute for the springs. The two devices are similar except that one is right and the other is left. As shown in the drawing, each device, in its preferred embodiment, comprises a resilient member, preferably a rectangular block 20 of rubber, adapted to be interposed between the motor support arm 10 and the chassis cross member 11. The block 20 is supported by the cross member and is of substantial size to provide ample support for the motor. It may rest on the auxiliary spring or directly on the cross member.

Secured to the upper portion of the block 20 is means providing a seat on the block for the motor support arm 10 and for loosely retaining the block 20 in place so that, on rebounds, the block 20 cannot be jarred out of operative position. To this end, a downwardly opening channel 21 of sheet metal is fitted over the top of the block and is secured thereto as by a pin 22 extending through the flanges of the channel and the block. Rigidly secured to the channel 21 is a member having a slot constructed to receive the motor support arm, said member preferably comprising an upwardly opening channel 23 formed from sheet metal. The flanges of the channel 23 thus extend upwardly past the faces of the arm 10 and the web of the channel provides a seat for the arm.

The channels 21 and 23 are rigidly secured together in back-to-back relation by a pair of rivets 24 and 25 with the heads of the rivets within the channel 23. One of the rivets, preferably the rivet 25, is so positioned that its head loosely fits within one of the notches 13 in the lower edge of the arm 10. It thus constitutes a lug preventing the device from slipping endwise on the arm, while the flanges of the channel 23 prevent the rivet head from moving laterally out of the notch.

From the above, it will be noted that the device will remain in its proper position with the rivet head 25 in the notch 13 so long as the arm 10 bears downwardly toward the chassis and is resiliently supported thereon. On a rebound, however, the arm and the chassis tend to separate. Such separation is sometimes of sufficient extent to permit the rivet head 25 to fall out of the notch. The device could therefore become improperly positioned. To prevent such an occurrence, the device is loosely held in such position that the rivet head 25 cannot slip entirely out of the notch. To this end, the device is tied to the arm 10 and for this purpose, retaining means is provided which extends over the top edge of the arm 10 and is spaced from the rivet head a distance slightly less than the width of the arm. As shown in Figs. 1 and 2, said means comprises a bolt 26 extending through the two flanges of the channels 23. Should the device tend to slip off the arm on a rebound, the bolt 26 abuts against the top edge of the arm and holds the device in place on the arm.

A modified form of retaining means is shown in Fig. 3, where two cuts 27 are made in the upper edge of one of the flanges of the channel 23. The two cuts provide a tang 28 which may be bent over the upper edge of the arm after the device is installed in place.

It will be noted that the device fits over a curved portion of the arm 10 and, on this account, bears upon the web of the channel only at the inner end thereof. The block 20 when in its proper position should bear squarely on the cross member 11 of the chassis. To prevent the device from turning around the curved portion of the arm, and hence becoming improperly positioned, an abutment such as a rivet 29 extends from one flange of the channel 23 to the other closely adjacent the lower edge of the arm 10 at the outer end of the channel. Thus, the rivet 29 at one end of the channel and the web at the other end prevent the device from turning relative to the arm.

In installing these devices, the motor support arm 10 is raised relative to the cross member 11 of the chassis, and the springs or other supports are removed. The auxiliary spring, if broken, may also be removed. The devices herein shown may then be moved into place from the side with the arm 10 fitting in the channels 23 and the rivet heads 25 fitting into the notches 13. Each device is tied to the arm either by inserting the bolt 26, or if the form shown in Fig. 3 is used, the tang 28 is bent over the upper edge of the arm. The arm 10 may then be lowered and the rubber blocks 20 will seat squarely on the chassis cross member 11.

From the above description, it will be apparent that I have provided a motor support which cannot easily be broken nor become dislodged from its proper position. It will also be apparent that my devices provide ample support for the motor and may be readily substituted for the springs or other devices now in use.

I claim as my invention:

1. A cushioned front motor support for an automobile of the character set forth comprising, in combination, a rubber block adapted to rest on the chassis, and means for loosely attaching said block to the motor support arm comprising a member attached to the block and having a slot adapted to receive said arm, a lug extending into said slot and constructed to fit loosely in a notch in the lower edge of said arm, and retaining means constructed to extend over the top edge of said arm, said retaining means being spaced from said lug a distance slightly less than the width of said arm to retain said lug in said notch and prevent the support from slipping longitudinally of said arm.

2. A cushioned front motor support for an automobile of the character set forth comprising, in combination, a resilient member adapted to be interposed between the motor support arm and the chassis in a predetermined position, and means for loosely retaining said member in said position comprising a lug constructed to fit loosely in a notch in the lower edge of said arm, a pair of spaced plates extending upwardly past the faces of said arm to prevent the lug from moving laterally out of said notch, means for securing said lug and said plates to said resilient member, and a member extending from one of said plates over the top edge of said arm and spaced from said lug a distance slightly less than the width of said arm to prevent said lug from slipping out of said notch.

3. A cushioned front motor support for an automobile of the character set forth comprising, in combination, a rectangular rubber block adapted to be interposed between the motor support arm and the chassis, and means for loosely retaining said block in place comprising a channel member fitting over the upper portion of said block, means for securing said block within the channel, a lug on the upper face of said channel constructed to fit loosely in a notch in the lower edge of said arm, a pair of spaced plates extending upwardly from said channel member and constructed to receive said arm therebetween, and a bolt connecting said plates over the top edge of said arm and positioned to prevent said lug from slipping out of said notch.

4. A cushioned front motor support for an automobile of the character set forth comprising, in combination, a rectangular rubber block adapted to be interposed between the motor support arm and the chassis, and means for loosely retaining said block in place comprising a downwardly opening channel member fitting over the upper portion of said block and secured thereto, an upwardly opening channel member constructed to receive said arm therein and to extend above the upper edge thereof, a rivet rigidly securing said channels together in back-to-back relation with the head of the rivet positioned within the upwardly opening channel and adapted to fit loosely in a notch in said arm, and means on the upper portion of said upwardly opening channel constructed to extend over the upper edge of said arm to prevent said rivet head from slipping out of said notch.

5. A cushioned front motor support for an automobile of the character set forth comprising, in combination, a resilient member adapted to be interposed between the motor support arm and the chassis, and means for loosely retaining said member in place comprising a positioning element secured to said member and constructed to loosely engage means on the lower edge of said arm, and means secured to said member and constructed to extend up the opposite faces of said arm and over the upper edge thereof to prevent the positioning element from slipping out of engagement with the means on the lower edge of said arm.

6. A cushioned front motor support for an automobile of the character set forth comprising, in combination, a resilient member adapted to be interposed between the motor support arm and the chassis, and means for loosely retaining said member in place comprising a seating element secured to the upper portion of said member and having a portion constructed to cooperate with means on the lower edge of said arm to position said member, and means constructed to extend over the upper edge of said arm to hold said element and said means on the lower edge of said arm in cooperative relation.

7. A cushioned front motor support for an automobile of the character set forth comprising, in combination, a resilient member adapted to be interposed between the motor support arm and the chassis, and means secured to said member for holding said member in operative relation to said arm comprising an element constructed to interlock with a portion of said arm to prevent horizontal displacement of said member, and additional means constructed to prevent disengagement of said element and the interlocking portion of said arm.

8. A cushioned front motor support for an automobile of the character set forth comprising, in combination, a resilient member adapted to be interposed between the motor support arm and the chassis, and means secured to said member for holding said member in place comprising a member shaped to engage three sides of said arm and having means to engage a portion of the fourth side of said arm.

9. A cushioned front motor support for an automobile of the character set forth comprising, in combination, a resilient member adapted to be interposed between the motor support arm and the chassis, and means for loosely retaining said member in place on a curved portion of said arm comprising a channel secured to said member and constructed to fit over said arm, a lug within the channel constructed to fit loosely in a notch in the lower edge of said arm, means on said channel constructed to extend over the upper edge of the said arm to retain the lug within the notch, the web at one end of said channel being positioned to abut against the lower edge of said arm and an abutment at the other end of said channel constructed to abut against the lower edge of said arm to prevent said member from turning out of place.

10. A cushioned front motor support for an automobile of the character set forth comprising, in combination, a resilient member adapted to be interposed between the motor support arm and the chassis, and means for loosely retaining said member in position comprising an upwardly opening channel secured to said member and constructed to receive said arm within the channel, and a positioning element rigid with the channel and constructed to engage a portion of the lower edge of said arm, one of the flanges of said channel having at its upper edge a portion adapted to be bent over the upper edge of said arm to retain the positioning element in engagement with the lower edge of the arm.

LAWRENCE F. KREGER.